(12) United States Patent
Kim

(10) Patent No.: US 6,415,947 B1
(45) Date of Patent: Jul. 9, 2002

(54) PLASTIC MADE RECTANGULAR AIRTIGHT CONTAINER FOR FOOD

(75) Inventor: Chang-Ho Kim, Incheon (KR)

(73) Assignee: Hana Cobi Co., Ltd., Icheon (KR)

( * ) Notice: Subject to any disclaimer, the term of this patent is extended or adjusted under 35 U.S.C. 154(b) by 0 days.

(21) Appl. No.: 09/667,007

(22) Filed: Sep. 21, 2000

(30) Foreign Application Priority Data

Jul. 15, 2000 (KR) ........................ 2000-40798

(51) Int. Cl.[7] ................................ B65D 41/18
(52) U.S. Cl. ........................ 220/788; 220/326
(58) Field of Search ................ 220/781, 784, 220/786, 788, 794, 795, 324, 326; 229/125.29, 931

(56) References Cited

U.S. PATENT DOCUMENTS

| | | | | |
|---|---|---|---|---|
| 3,688,942 A | * | 9/1972 | Mitchell et al. | |
| 3,817,419 A | * | 6/1974 | Moller et al. | |
| 4,603,809 A | * | 8/1986 | Vilotte et al. | |
| 4,721,056 A | * | 1/1988 | Steeley | |
| 5,348,181 A | * | 9/1994 | Smith et al. | 220/326 |
| 5,538,154 A | * | 7/1996 | Von Holdt | |
| 6,220,507 B1 | * | 4/2001 | Guillin | |
| 6,253,952 B1 | * | 7/2001 | Vial B. | 220/788 |

* cited by examiner

Primary Examiner—Nathan J. Newhouse
(74) Attorney, Agent, or Firm—Birch, Stewart, Kolasch & Birch, LLP

(57) ABSTRACT

A plastic, rectangular, airtight container for accommodating food items which comprising a rectangular by shaped container main body having four sides, a plurality locking projections provided on each of the four sides of the container main body, a lid provided with locking wings which are hinged along the periphery of the lid, each said locking wing provided with locking holes which accommodate the locking projections, and each said locking wing provided with a flow intercepting hole disposed between the locking holes for forming channels therebetween so that the plastic molten liquid is induced to flow through said channels by bypassing the molten liquid flow intercepting hole.

5 Claims, 4 Drawing Sheets

PLASTIC MADE RECTANGULAR AIRTIGHT CONTAINER FOR FOOD

BACKGROUND OF THE INVENTION

1. Field of the Invention

The present invention relates to a plastic made, rectangular airtight container for food.

2. Related Art

As a container for housing and storing food, a plastic made airtight container 101 as shown in FIG. 4 to FIG. 6 is widely used.

This plastic made airtight container 101 consists, of container main body 103 and lid 102, a plurality of locking projections 110 projected at top portion of the container main body 103, and locking wing pieces 105 which are folded and unfolded around hinge 106. The wing pieces rotatively move around hinge 106 which are formed integrally with the top lid surface 104 of the lid 102. Locking holes 107 are inserted and locked to locking projections 110 formed to lock with the wing pieces 105 at a position corresponding to each locking projection 110.

A recess 111 is formed in the top lid surface 104 of lid 102 which is adapted to engage with the top edge 113 of the container main body 103. A packing 112 can be inserted into groove 111.

Accordingly, when the lid 102 is placed on the container main body 103 and a finger pressing portion 105a is pressed by a finger, i. e., when the locking wing piece 105 is pressed toward the locking projection 110 of the container main body 103, the locking projections 110 are locked by passing them through locking holes 107a nd 107b, respectively. Since the top edge 113 presses against the packing 112, the interior space 114 of the container main body 103 is hermetically sealed from the exterior.

However, in accordance with above described airtight container 101, the locking wing piece 105 is connected by a hinge 106 which is decreased very much in thickness, and since the hinge 106 has to be folded and unfolded by the locking wing piece 105, a bending stress is repeatedly produced and therefore is very weak.

On the other hand, as shown in drawings, in the case of an elongated rectangular airtight container 101, and in the case where the length of one side is more than 10 cm, the locking hole 107 of the locking wing piece 101 and the locking projection 110 of the container main body 103 are made to be two on each side so as to secure a sufficient locking force and a uniformity of the hermetical sealing force (airtight force).

In the case of a rectangular airtight container 101 with a lid 102, since a plastic molten liquid pouring gate 115 is formed to an injection metal mold corresponding to the right center of the lid 102, in the process in which the plastic molten liquid spreads out in every direction from the molten liquid pouring gate 115 and fills up the cavity of metal mold by which the lid 102 is made, the traveling time in which the plastic molten liquid is spread to each end terminal portion of the mold is different, and since the molten liquid flows in counter current directions to itself, collisions of the molten liquid forms weld lines, and strength weakened portions.

Since both end terminal portions 105b of the locking wing piece 105 are most distanced from the molten liquid pouring gate 115 whereby the molten liquid traveling time is the longest, and since the gorge portion 105b is formed due to the locking hole 107, the gorge portion 105b operates as a resistive means for the flow of molten liquid, whereby the flow of the molten liquid flow becomes stagnated. On the other hand, for a center portion between both side locking holes 107, since the distance from the molten liquid pouring gate 115 is closer and the clearance is greater and the flowing resistance is less, the flow of molten liquid becomes smooth whereby the flow of molten liquid occurs as shown by arrows. Thus, the molten liquid collides with itself at the hinge end portion 106a which is the end terminal portion of the hinge 106, thereby forming a weld line. (Generally the weld line is formed at the hinge end terminal portion at a rate of 5–15%).

When a weld line is formed by the collision of the molten liquid, at the hinge end portion 106a, a thin hinge end portion 106a forms a cracked portion which is easily torn out and damaged when locking the wing piece portion 105 is repeatedly folded and unfolded. Once the hinge end portion 106a is torn out, even just a little, it continuously spreads out whereby the life of the airtight container 101 is considerably decreased, and this dissatisfaction of the consumer has been pointed out as a significant problem. Since this inferiority of product cannot be confirmed at manufacturing state, and since the problem would appear only after a predetermined time is past while the consumer is using the product (but in a further short time than regular life of the product), this problem is a big issue for consumer protection.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

BACKGROUND AND SUMMARY OF THE INVENTION

Accordingly, it is an object of the present invention to provide a plastic, rectangular airtight container for food in which during the manufacture of the container, the flow of the molten plastic liquid is caused to occur smoothly and uniformly in every direction, and the weld line which is produced in the body portion has no influence on the strength of the hinge device since the hinge portion is avoided.

Accordingly, the present invention is directed to a plastic, rectangular airtight container for food which comprises a rectangular container main body in which length of one side is longer than other side;

a plurality of locking projections including one or two projections formed at the four sides of the container main body, respectively, but two are formed with a predetermined distance from one another along the long side;

a lid having locking wing portions provided with locking holes for receiving the locking projections, and wherein the locking wing is rotatably connected. by a hinge portion to the lid;

and a packing which is mounted to top cover piece of the lid for hermetically sealing the container main body;

wherein a molten liquid flow intercepting hole for forming a gorge between locking holes is formed at two places, to the right and left of the locking wing piece, so that the plastic molten liquid is caused to flow to both sides of the gorges by bypassing the molten liquid flow intercepting hole.

DETAILED DESCRIPTION OF THE PREFERRED EMBODIMENTS

Hereinafter, a preferred embodiment of the present invention will be described in more detail with reference to the accompanying drawings.

Figure 1:
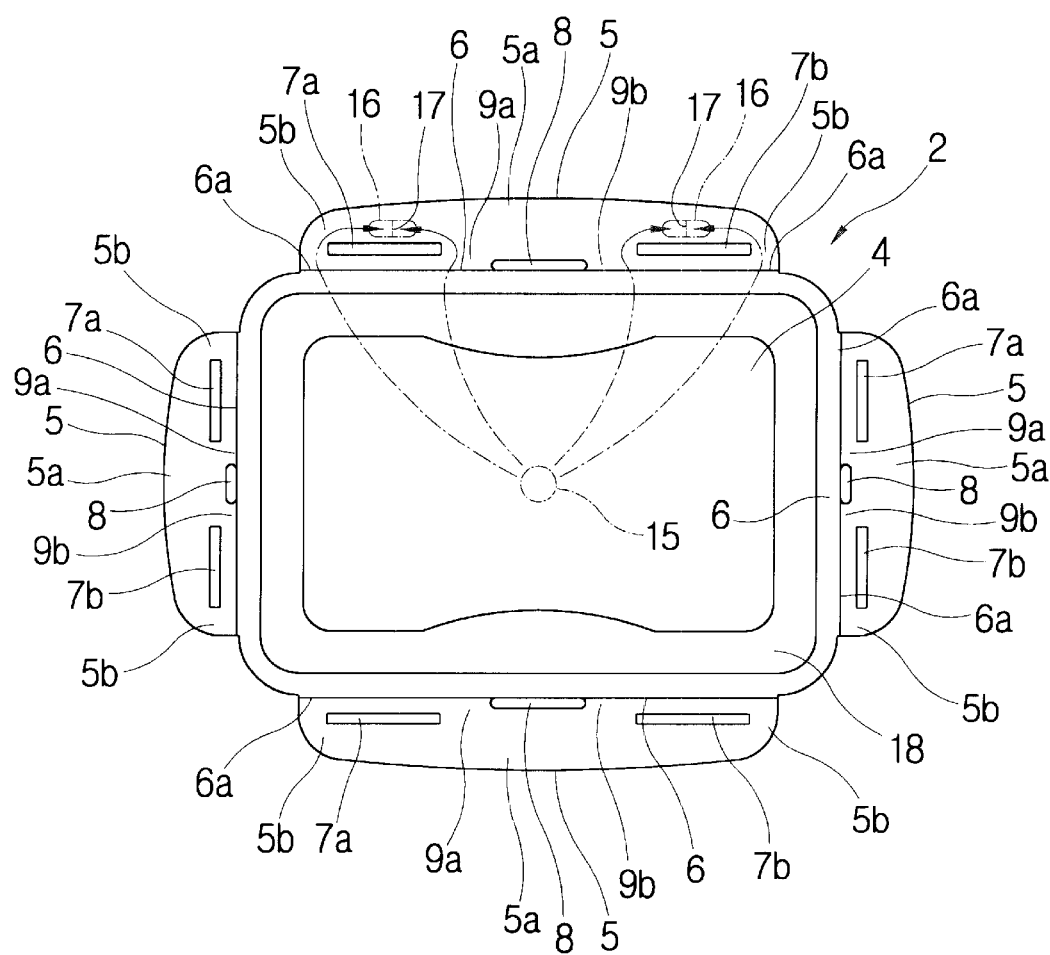
FIG. 1 is a view showing the lid of a plastic airtight container for food in accordance with the present invention.
Figure 2:
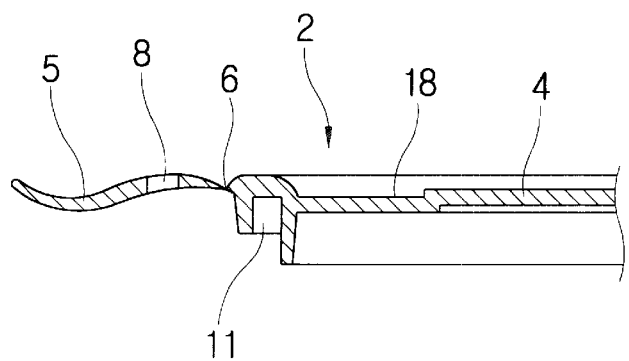
FIG. 2 is a cross sectional view of the lid of FIG. 1.
Figure 3:
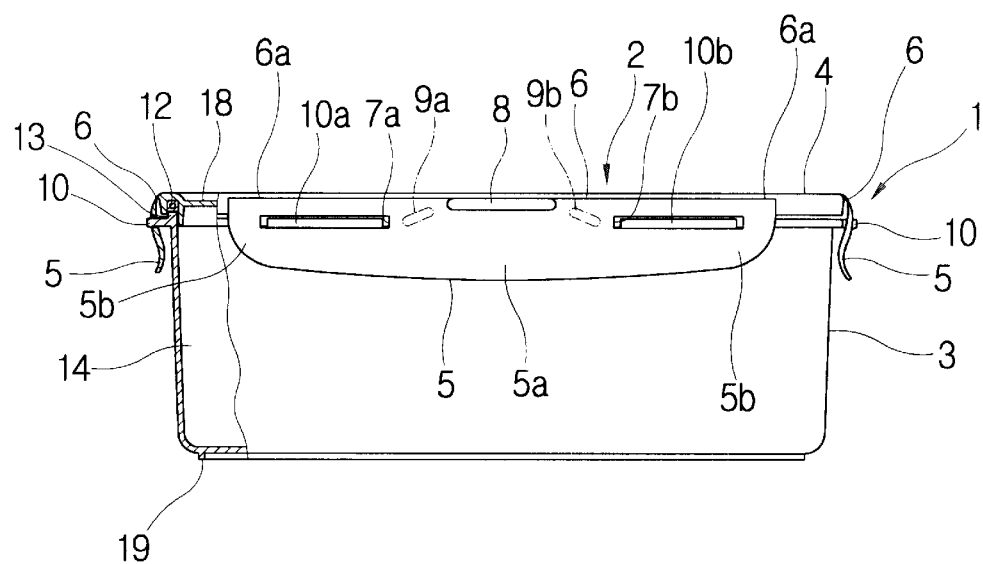
FIG. 3 is a view showing a rectangular airtight container comprising an assembled lid and container main body, in accordance with the present invention.
Figure 4:
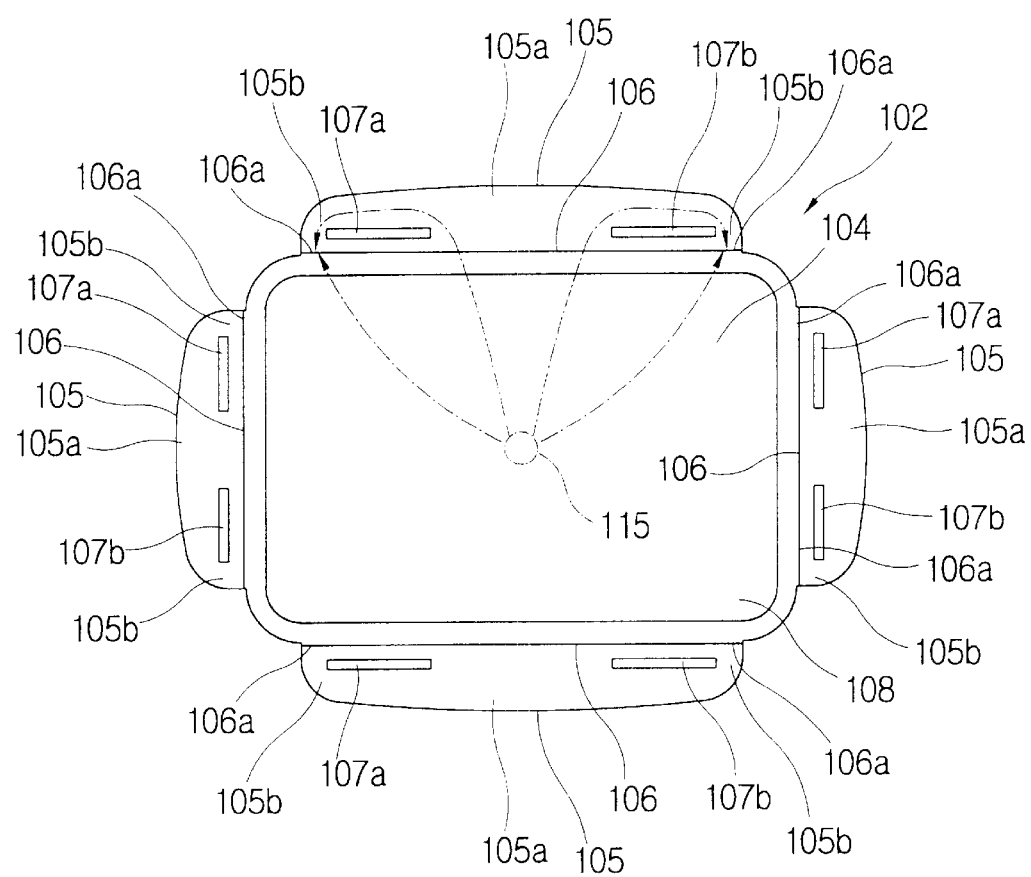
FIG. 4 to FIG. 6 are views showing a conventional, rectangular airtight container.
Figure 5:
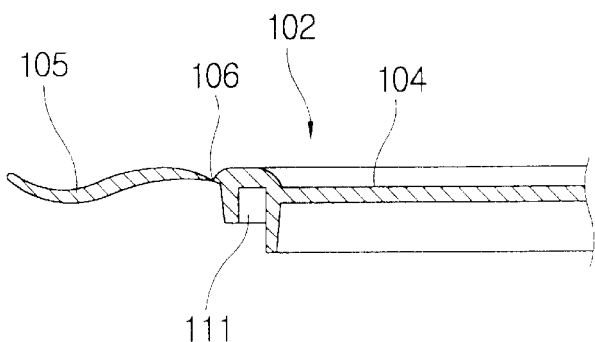
Figure 6:
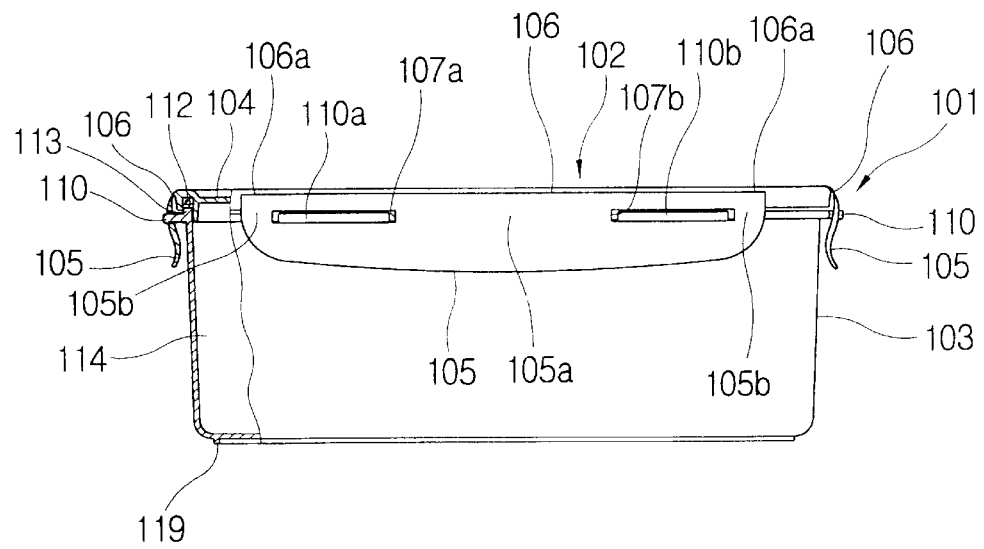

FIG. 1 is a view showing a lid of a plastic, rectangular, airtight container for food in accordance with the present invention;

FIG. 2 is a cross sectional view of the lid of FIG. 1 in accordance with the invention; and FIG. 3 is a view showing the rectangular, airtight container of the present invention which is hermetically sealed by a lid.

In the drawings, reference numeral 1 is a rectangular, airtight container which consists of a lid 2 and a container main body 3.

The container main body 3 has a rectangular configuration, in which the length of one side is longer than the other side, and the lid 2 and the container main body 3 are made by injection molding with a plastic material (including silicon).

The lid 2 consists of top cover surface 4, and locking wing pieces 5 extending in every direction from the top cover surface 4. The locking wing pieces 5 are made to be connected to the top cover surface 4 by a hinge 6 which is thinner in thickness relative to other portions so that the locking wing pieces 5 are provided with a bendable or rotatable movement using the hinge 6.

The locking holes 7a, 7b (they are represented by reference numeral 7 when expressing as representative) are formed in which the length l is longer than the width b.

For the locking hole 7, at least two holes 7a, 7b are formed at both sides of the locking wing piece 5, and a molten liquid flow intercepting hole 8 is formed between said two locking holes 7a, 7b.

Gorges 9a, 9b are formed between the molten liquid flow intercepting hole 8 and the locking holes 7a, 7b, located at both sides thereof.

And, locking projections 10a, 10b (depicted by reference numeral 10 when representatively expressed) are respectively formed to project in every direction from the top portion of the container main body 3 from positions confronting the locking holes 7a, 7b.

Accordingly, when the locking wing piece 5 is pressed toward the locking projections 10, the locking holes 7 engage the locking projections 10 and the lid 2 is assembled and locked to the container main body 10. A packing 12 is provided in groove 11 to hermetically seal the container main body 3.

In accordance with the present invention, since a molten liquid flow intercepting hole 8 is formed in the locking wing piece 5 of the lid 2, gorges or channels 9a, 9b are formed to facilitate the injection molding operation which is to be utilized.

A shape identical with that of the lid 2 is formed as a cavity for the metal mold. When plastic molten material is poured through the molten liquid pouring gate 15 formed in the metal mold at a central position of the lid 2, the molten resin spreads out to every direction.

At this moment, when the molten liquid spreading from the molten liquid pouring gate 15 reaches the molten liquid flow intercepting hole 8 nearest to the gate 15, the flow bypasses the intercepting hole 8 after being blocked by the intercepting hole 8. Both sides of the intercepting hole 8 form with the locking holes 7a, 7b, narrow channels 9a, 9b, a flow of the molten liquid is not smooth, and when passing the gorge 9, a pressing portion (5a, a portion to be pressed by hand when shutting the lid) of broad area is appeared, and a time is required for which the molten liquid fills the pressing portion 5a and flows to both ends 5b of the locking wing piece 5.

Because the flow of molten liquid is delayed when passing through the channels 9a, 9b, and even through the distance from the molten liquid pouring gate 15 to both ends 5b, 5b of the locking wing piece 5 is farer away than the distance to the molten liquid flow intercepting hole 8, the molten liquid passing through the channels 9a, 9b and thereof both ends 5b, 5b meet at the location of reference numeral 16 as shown, so that weld lines 17, 17 are formed at reference numeral 16 and not at both ends 6a, 6a of the hinge 6. Because the weld line 17 is formed at reference numeral 16 and not at the hinge location 6a, the hinge 6a is not damaged and originally designed life of the hinge can be maintained, even if the locking wing piece 5 is repeatedly folded and unfolded for long period of time.

When the molten liquid flow intercepting hole 8 is formed to be long in length, relative to its width, and when it is formed along the hinge line 6, the entire length of the hinge 6 is shortened and thus the resilient force required to operate the locking wing piece 5 is decreased, thereby making the assembling of the lid easy. Also, the stress to the hinge 6 is decreased whereby damage due to bending of the hinge 6 is decreased.

Also, as shown in FIG. 3, a portion 18 of the lid is recessed so that damages to the lid due to contact among containers when stacking is prevented. Also, the portion 18 can be formed to be coarse and opaque by sand blasting to the metal mold used in the injection molding process, accordingly, if the lid is inadvertently scratched, the rough surface conceals, the problem.

Thus in accordance with the present invention, a molten liquid flow intercepting hole is formed between two locking holes formed in the locking wing of a rectangular, airtight container whereby a channel is formed so that the flow of the molten material, such as silicon or a special synthetic resin is coordinated so that the weld line is formed which avoids the hinge portion of the lid which is thin and made weak by repeated bending stress. Thus, the life can be extended which inherently extends the life of the container.

What is claimed is:

1. A plastic, rectangular, airtight container for accommodating food items which comprises:

a rectangularly shaped container main body having four sides;

a plurality locking projections provided on each of the four sides of the container main body;

a lid provided with locking wings which are hinged along the periphery of the lid, each said locking wing provided with locking holes which accommodate the locking projections, and;

each said locking wing provided with a flow intercepting hole disposed between the locking holes for forming channels therebetween so that the plastic molten liquid is induced to flow through said channels by bypassing the flow intercepting hole.

2. The plastic, rectangular, airtight container for accommodating food as defined in claim 1, wherein each said flow intercepting hole is formed along the hinge portion of the locking wing so that entire line length of the hinge portion is shortened.

3. The plastic, rectangular, airtight container for accommodating food as defined in claim 1, wherein the lid and the container bottom are provided with complimentary recesses and protrusions to facilitate stacking.

4. The plastic, airtight container of claim 1, wherein the lid is provided with a peripheral recess for engaging with the top of the container main body, said peripheral recess adapted to contain a packing for hermetically sealing the container.

5. The plastic, airtight container of claim 1, wherein the lid is provided with a rough sand-blasted appearance.

* * * * *